United States Patent [19]

Nakano et al.

[11] Patent Number: 4,549,229

[45] Date of Patent: Oct. 22, 1985

[54] METHOD AND APPARATUS FOR COMPENSATING FOR TAPE JITTER DURING RECORDING AND REPRODUCING OF A VIDEO SIGNAL AND PCM AUDIO SIGNAL

[75] Inventors: Kenji Nakano; Hisayoshi Moriwaki; Takao Takahashi, all of Kanagawa, Japan

[73] Assignee: Sony Corporation, Tokyo, Japan

[21] Appl. No.: 462,517

[22] Filed: Jan. 31, 1983

[30] Foreign Application Priority Data

Feb. 1, 1982 [JP] Japan ............................... 57-14655
Feb. 18, 1982 [JP] Japan ............................... 57-14656

[51] Int. Cl.⁴ .............................................. G11B 5/09
[52] U.S. Cl. ............................. 360/8; 358/343; 358/339; 360/19.1; 360/36.2; 360/64
[58] Field of Search ............... 360/19.1, 8, 36.2, 32, 360/37.1, 64; 358/343, 339, 310, 319

[56] References Cited

U.S. PATENT DOCUMENTS

| | | | |
|---|---|---|---|
| 4,303,950 | 12/1981 | Taniguchi | 360/19.1 |
| 4,353,098 | 10/1982 | Heinz | 360/19.1 |
| 4,390,906 | 6/1983 | Furumoto | 360/19.1 |
| 4,409,627 | 10/1983 | Eto | 360/37.1 |
| 4,473,850 | 9/1984 | Foerster | 360/19.1 |

*Primary Examiner*—Alan Faber

*Attorney, Agent, or Firm*—Lewis H. Eslinger; Alvin Sinderbrand

[57] ABSTRACT

Apparatus for recording and reproducing an information signal comprised of a video signal and an audio signal in a plurality of successive tracks on a magnetic tape, includes a recording section comprised of a PCM processor which converts the audio signal to a PCM audio signal and compresses the same, a dummy signal generator for compensating for tape jitter by generating a dummy signal and supplying the same to the PCM processor where the dummy signal is added both before and after each portion of the compressed PCM audio signal to be recorded in an overscan section of each track, and a magnetic head assembly which records the video signal in a main section of each track and each portion of the compressed PCM audio signal and dummy signal added thereto in the overscan section of each track; and a reproducing section comprised of a magnetic head assembly which scans the tracks to reproduce the information signal recorded therein, a switch assembly which separates the video signal reproduced from the main section of each track and the PCM audio signal reproduced from the overscan section of each track; a PCM processor which converts the PCM audio signal to the original analog audio signal and a timing signal generator for compensating for tape jitter by enabling the PCM processor only during a period slightly greater than the period of the PCM audio signal recorded in the overscan section of each track.

19 Claims, 22 Drawing Figures

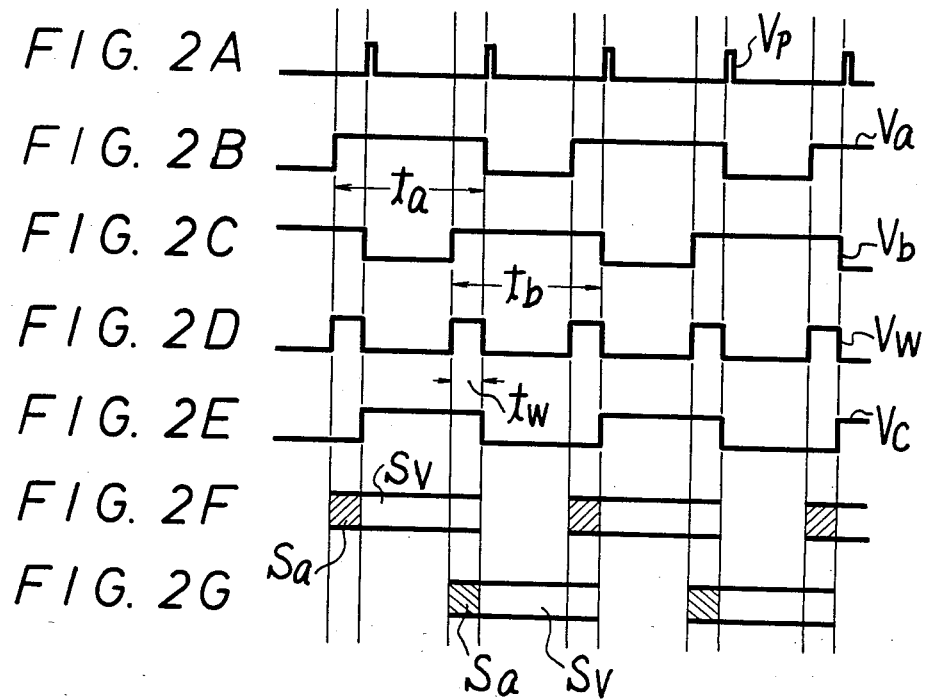
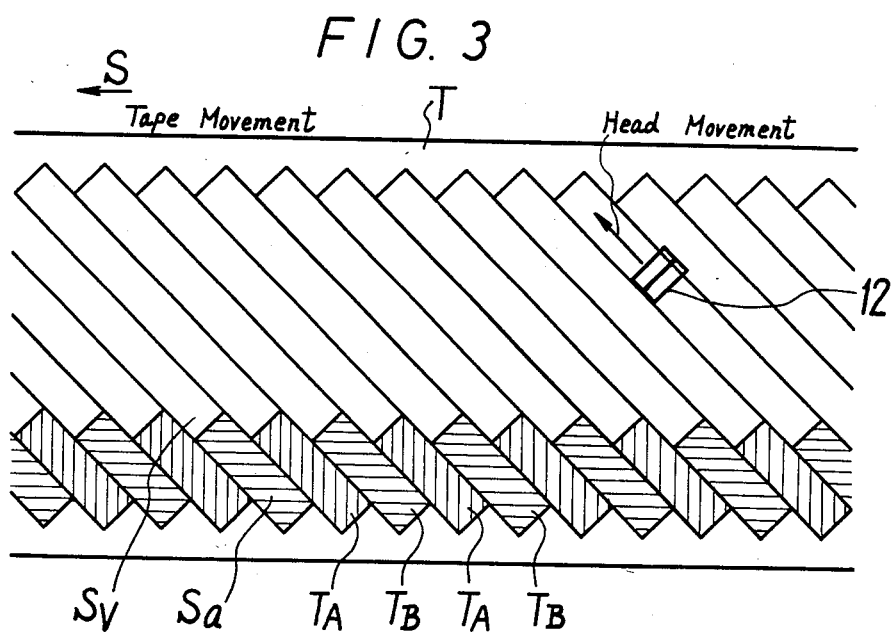

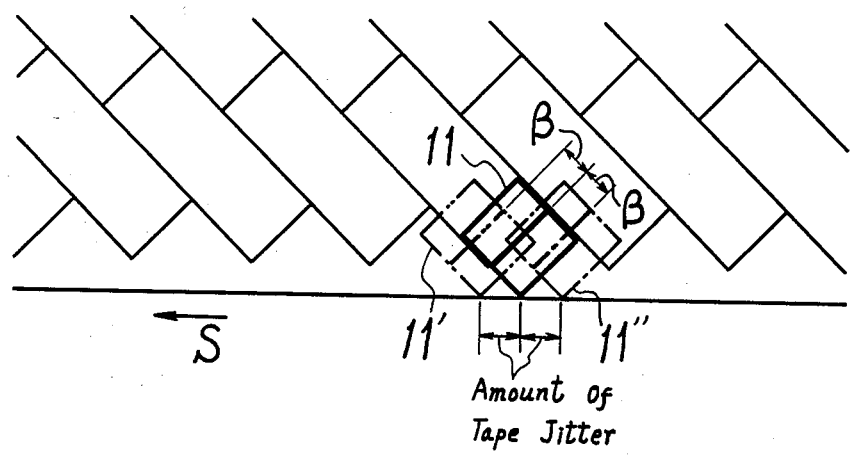
FIG. 4
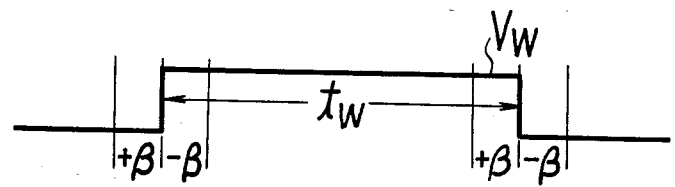
FIG. 5A
FIG. 5B
FIG. 5C
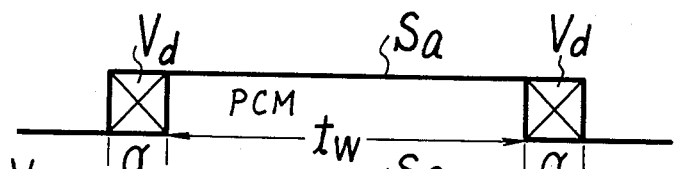
FIG. 6A
FIG. 6B
FIG. 6C

METHOD AND APPARATUS FOR COMPENSATING FOR TAPE JITTER DURING RECORDING AND REPRODUCING OF A VIDEO SIGNAL AND PCM AUDIO SIGNAL

BACKGROUND OF THE INVENTION

This invention relates generally to a method and apparatus for recording and reproducing an information signal and, more particularly, is directed to a method and apparatus for recording and reproducing a color television signal comprised of a video signal and an audio signal on a magnetic tape with a plurality of rotary magnetic heads.

Information signal recording and reproducing apparatus for recording and reproducing a video signal on a magnetic tape by means of a rotary magnetic head assembly are well known in the art. For example, in a helical scan video tape recorder (VTR), at least one rotary magnetic head is rotated at a predetermined angle with respect to the longitudinal or tape running direction of a magnetic tape as the latter is advanced so as to form successive video tracks extending obliquely on the magnetic tape. With the helical scan video tape recorder, it is possible to achieve high density recording of the video signal by advancing the magnetic tape at a slow running speed and, at the same time, providing a high relative speed between the magnetic head assembly and magnetic tape. However, with known helical scan video tape recorders in which an audio signal is recorded and reproduced on an audio track extending in the longitudinal or tape running direction of the magnetic tape by a stationary magnetic head, there results a deterioration of the signal-to-noise (S/N) ratio and an increase in the wow and flutter when the speed of advancement of the magnetic tape is reduced. This, of course, results in a deterioration in the quality of the reproduced audio signal, causing the audio signal to have unsatisfactory quality when reproduced.

In order to overcome the aforementioned problem in the recording and reproducing of an audio signal by a stationary magnetic head, it has been proposed to effect the recording and reproducing of the audio signal by means of a rotary magnetic head. With this proposal, an overscan section is provided for each oblique track, for example, by increasing the tape winding angle about the guide drum assembly of the helical scan video tape recorder. In this manner, each record track obliquely formed on the magnetic tape by the rotary magnetic head assembly includes a video track section and an audio track section, the latter of which corresponds to the aforementioned overscan section. The audio signal that is recorded and reproduced with respect to the audio track section of each track is processed as high density data obtained by processing the signal with a time axis or base compression and a time axis or base expansion.

In one known apparatus, two rotary magnetic heads are provided and are spaced apart by 180°. Thus, each head scans alternate ones of the successive tracks extending obliquely on the magnetic tape. It has been proposed to digitize and compress the audio signal and record the same in an overscan section at the beginning of each track with such known apparatus. Such arrangement provides the desirable feature of recording the video signal and digitized audio signal in separate sections of each track so that editing thereof can be readily achieved. In other words, with such arrangement, it becomes relatively easy to re-record a different audio sound track in the overscan section of each track for the same video signal. However, in such case, tape jitter and the like, due to, for example, contraction and expansion of the magnetic tape and inaccuracies in the tape transport system, may result in errors in the timing between the already recorded tracks and the magnetic heads which are to re-record the audio signal therein. As a result, the re-recorded digitized audio signal will not completely overlap, and will therefore not completely erase, the digitized audio signal originally recorded in the overscan section of each track. This unerased portion of the digitized audio signal originally recorded in the record tracks, of course, results in undesirable noise during playback.

Tape jitter and the like may also result in another problem with the aforementioned helical scan video tape recorder. More particularly, because the digitized audio signal is recorded in compressed form in each track, reproduction of the digitized audio signal from each track occurs during only a fraction of the respective field interval within which the digitized audio signal is situated. During the remainder of the respective field interval, the head used for reproducing the digitized audio signal is not in contact with the magnetic tape. However, due to leakage of the video signal reproduced by the other head, undesirable noise may be leaked to an audio digital processing circuit in the reproducing section of the helical scan video tape recorder. In this regard, the audio digital processing circuit in the reproducing section is generally supplied with a window signal having a duration equal to the period of the digitized audio signal in the overscan section of each track. The window signal enables the audio digital processing circuit to expand, decode and convert the digitized audio signal to an analog audio signal only during the period of the window signal so that any extraneous or leaked noise is not reproduced. However, when tape jitter and the like occurs due to, for example, contraction and expansion of the tape and inaccuracies in the tape transport system, a portion of the digitized audio signal in the overscan section of each track may be reproduced outside of the period of the window signal, so that part of the digitized audio signal is not reproduced.

OBJECTS AND SUMMARY OF THE INVENTION

Accordingly, it is an object of this invention to provide a method and apparatus for recording and reproducing an information signal that avoids the above-described difficulties encountered with previously known apparatus.

More particularly, it is an object of this invention to provide a method and apparatus for recording and reproducing an information signal that substantially reduces problems caused by tape jitter.

It is another object of this invention to provide a method and apparatus for recording and reproducing an information signal in which, upon re-recording a digitized audio signal in an overscan section of each track, a dummy signal is added thereto.

It is still another object of this invention to provide a method and apparatus for recording and reproducing an information signal comprised of a video signal and a digitized audio signal such that the period of operation of an audio digital processing circuit at the reproducing side of the apparatus is enabled for a period slightly greater than the period of the digitized audio signal recorded in the overscan section of each record track.

In accordance with an aspect of this invention, apparatus for recording an information signal comprised of a video signal and an audio signal in a plurality of successive tracks on a record medium includes converting means for converting the audio signal into digital form; compression means for compressing the digitized audio signal; jitter compensation means for compensating for jitter of the record medium by adding a dummy signal to the compressed digitized audio signal; and transducer means for recording the video signal in a main section of each track and the compressed digitized audio signal and the dummy signal in an overscan section of each track.

In accordance with another aspect of this invention, apparatus for reproducing an information signal comprised of a video signal and a digitized audio signal recorded in a plurality of successive tracks on a record medium, with the video signal being recorded in a main section of each track and the digitized audio signal being recorded in an overscan section of each track, includes transducer means for scanning the tracks to reproduce the information signal recorded in the plurality of successive tracks; switch means for separating the video signal reproduced during scanning of the main section of each track by the transducer means and the digitized audio signal reproduced during scanning of the overscan section of each track by the transducer means; processing means for converting the digitized audio signal to an analog audio signal; and jitter compensation mean for compensating for jitter of the record medium by enabling the processing means during a period slightly greater than the period of the digitized audio signal recorded in the overscan section of each track.

In accordance with still another aspect of this invention, apparatus for recording and reproducing an information signal comprised of a video signal and an audio signal in a plurality of successive tracks on a record medium includes a recording section comprised of converting means for converting the audio signal into digital form, compression means for compressing the digitized audio signal, first jitter compensation means for compensating for jitter of the record medium by adding a dummy signal to the compressed digitized audio signal, and recording transducer means for recording the video signal in a main section of each track and the compressed digitized audio signal and the dummy signal in an overscan section of each track; and a reproducing section comprised of reproducing transducer means for scanning the tracks to reproduce the information signal recorded in the plurality of successive tracks, switch means for separating the video signal reproduced during scanning of the main section of each track by the reproducing transducer means and the digitized audio signal reproduced during scanning of the overscan section of each track by the transducer means, processing means for converting the digitized audio signal to analog form, and second jitter compensation means for compensating for jitter of the record medium by enabling the processing means during a period slightly greater than the period of the digitized audio signal recorded in the overscan section of each track.

The above, and other, objects, features and advantages of the present invention will become readily apparent from the following detailed description thereof which is to be read in connection with the accompanying drawings.

BRIEF DESCRIPTION OF THE DRAWINGS

FIGS. 2A–2G are waveform diagrams used for explaining the operation of the apparatus of FIG. 1;

FIG. 3 is a schematic plan view of a section of magnetic tape showing an arrangement in which video and audio signals are recorded with the apparatus of FIG. 1;

FIG. 4 is a schematic plan view of a section of magnetic tape, illustrating a problem caused by tape jitter during re-recording of a digitized audio signal in the overscan section of a record track;

FIGS. 5A–5C are waveform diagrams used to further illustrate the problem caused by tape jitter during re-recording of a digitized audio signal in the overscan section of a record track;

FIGS. 6A–6C are waveform diagrams used for explaining the operation of the apparatus of FIG. 1 according to the present invention in overcoming the problem of tape jitter shown in FIGS. 5A–5C;

DETAILED DESCRIPTION OF THE PREFERRED EMBODIMENTS

Figure 1:
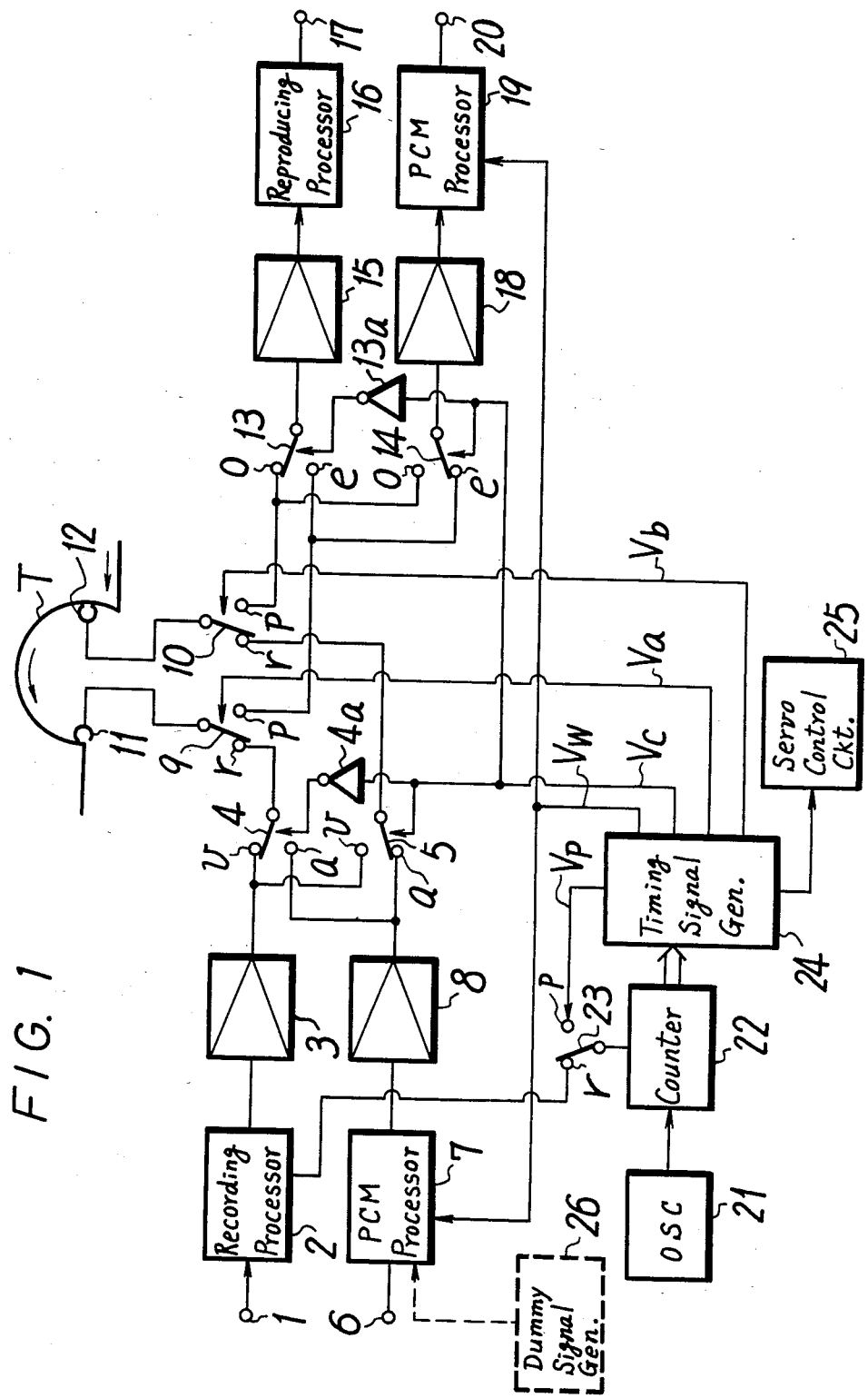
FIG. 1 is a block diagram of apparatus for recording and reproducing an information signal according to one embodiment of the present invention.

Referring to the drawings in detail, and initially to FIG. 1 thereof, a helical scan video tape recorder (VTR) according to one embodiment of the present invention includes a recording processing circuit 2 supplied with a color video signal from an input terminal 1. Recording processing circuit 2 includes, for example, a frequency modulator for frequency modulating the luminance component of the color video signal and a frequency converter for frequency converting the chrominance component of the color video signal to a lower frequency band. The color video signal $S_v$ from recording processing circuit 2 is supplied through a recording amplifier 3 to fixed contacts v of change-over switches 4 and 5.

In addition, an analog audio signal is supplied to an audio circuit of the recording section of the VTR and, in particular, to a PCM processing circuit 7 from an input terminal 6. PCM processing circuit 7 includes an analog-to-digital (A/D) converting circuit which converts the analog audio signal to a digital signal, a PCM encoding circuit which encodes the digitized audio signal and adds error correcting codes thereto to produce an encoded PCM audio signal, and a compression circuit which compresses the encoded PCM audio signal to produce a compressed PCM audio signal $S_a$ at the output of PCM processing circuit 7. The latter PCM audio signal from PCM processing circuit 7 is then supplied through a recording amplifier 8 to fixed contacts a of change-over switches 4 and 5. Each of change-over switches 4 and 5 includes a movable arm which is controlled to alternately connect fixed contacts a and v thereof to the output thereof during alternate field intervals of the color video signal, in response to a switch control signal $V_c$.

More particularly, an oscillator 21 supplies a clock signal comprised of a plurality of clock pulses to a counter 22, the latter also being supplied, at a reset input terminal thereof, with the vertical synchronizing signal $V_s$, shown in FIG. 2A, of the color video signal. Vertical synchronizing signal $V_s$ is separated from the color video signal by recording processing circuit 2 and is supplied to the reset input terminal of counter 22 through a switch 23. As shown in FIG. 1, switch 23 includes fixed contacts r and p and a movable arm for connecting the signal supplied to fixed contact r to the reset input terminal of counter 22 during the recording mode of operation and for supplying the signal supplied to fixed contact p to the reset input terminal of counter 22 during the reproducing or playback mode of operation. In this regard, during the recording mode of operation, counter 22 counts the number of clock pulses from oscillator 21 during each field interval, that is, betweeen successive vertical synchronizing pulses of vertical synchronizing signal $V_s$. A signal corresponding to the count from counter 22 is then supplied to a control or timing signal generator 24 which is comprised of decoding and like circuitry and which produces the aforementioned switch control signal $V_c$.

As shown in FIG. 2E, switch control signal $V_c$ alternates between a high or logic "1" level and a low or logic "0" level during successive field intervals, and is supplied directly to change-over switch 5 and through an inverter 4a to change-over switch 4. In this manner, during alternative field intervals when the switch control signal $V_c$ is at a high or logic "1" level, the movable arm of change-over switch 4 is connected to fixed contact v thereof to supply the color video signal $S_v$ from recording amplifier 3 to a rotary magnetic head 11 and the movable arm of change-over switch 5 is connected to fixed contact a thereof to supply the compressed PCM audio signal $S_a$ from recording amplifier 8 to a rotary magnetic head 12. On the other hand, during the remaining alternate field intervals when switch control signal $V_c$ is at a low or logic "0" level, the movable arm of change-over switch 4 is connected to fixed contact a thereof to supply the compressed PCM audio signal $S_a$ from recording amplifier 8 to rotary magnetic head 11 and the movable arm of change-over switch 5 is connected to fixed contact v thereof to supply the color video signal $S_v$ from recording amplifier 3 to rotary magnetic head 12.

The output signal from change-over switch 4 is supplied to a fixed contact r of another change-over switch 9, having its movable arm connected to first magnetic head 11, while the output signal from change-over switch 5 is connected to a fixed contact r of another change-over switch 10, having its movable arm connected to second magnetic head 12. Change-over switches 9 and 10 also include fixed contacts p. In this regard, timing signal generator also supplies switch control signals $V_a$ and $V_b$, shown in FIGS. 2B and 2C, to change-over switches 9 and 10, respectively, so that, during a recording operation, the output signals from change-over switches 4 and 5 are only supplied to magnetic heads 11 and 12, respectively, when the latter heads are in contact with a magnetic tape T.

As shown in FIG. 1, rotary magnetic heads 11 and 12 are arranged to subtend an angle of 180°, that is, the two rotary magnetic heads 11 and 12 are arranged in diametrically opposing relation to each other. A rotary magnetic head assembly (not shown) is provided and includes a rotary guide drum (not shown) which is rotated, along with heads 11 and 12 secured thereto, in the direction of the arrow shown in FIG. 3, and magnetic tape T is helically wound about the outer periphery of the rotary guide drum so as to subtend an angle of approximately 220°. Magnetic tape T is advanced at a constant speed in the direction of arrow S in FIG. 3 by a tape drive system (not shown) comprised of a capstan and pinch roller and is guided about the rotary guide drum by guide rollers or pins. During the recording operation, rotary magnetic heads 11 and 12 alternately trace record tracks $T_A$ and $T_B$ as shown, for example, in FIG. 3. In this manner, each record track $T_A$ is used for recording video and audio signals in odd field intervals, while the remaining alternate record tracks $T_B$ are used for recording video and audio signals in even field intervals.

It is to be appreciated that, since the angle between rotary magnetic heads 11 and 12 is less than the angle subtended by the tape wound about the outer periphery of the rotary guide drum, rotary magnetic heads 11 and 12 are simultaneously in contact with magnetic tape T during an overscan or overlap period. In particular, and referring to FIGS. 1 and 3, rotary magnetic heads 11 and 12 record the compressed PCM audio signal $S_a$ in the overscan section of each track at the leading edge thereof corresponding to the first 30° rotation of the magnetic heads with respect to the record tracks. During the last or next 180° rotation of each head with respect to the record tracks, one field interval of the color video signal $S_v$ is recorded in the same track following the previously recorded compressed PCM audio signal $S_a$. Thus, each head records the audio signal and video signal in respective tracks during rotation thereof of 210°. Since the heads are in contact with tape T for approximately 220°, each head is therefore in contact with the tape for an additional 5° prior to recording a track and an additional 5° after recording a track. This is shown more particularly with respect to FIGS. 2F, 2G and 3, in which the compressed PCM audio signal $S_a$ is recorded in the leading or overscan section of each track, while the color video signal $S_v$ is recorded in the trailing or main section of each track.

Thus, the movable arm of change-over switch 9 is connected to fixed contact r thereof when switch control signal $V_a$ is at a high or logic "1" level during time period $t_a$, as shown in FIG. 2B, which corresponds to the combined time periods of the compressed PCM audio signal $S_a$ and the color video signal $S_v$ to be recorded in each track $T_A$, while the movable arm of change-over switch 10 is connected to fixed contact r thereof when switch control signal $V_b$ is at a high or logic "1" level during time period $t_b$, as shown in FIG. 2C, which corresponds to the combined time periods of the compressed PCM audio signal $S_a$ and the color video signal $S_v$ to be recorded in each track $T_B$. In this regard, the PCM audio signal $S_a$ (hatched areas) and color video signal $S_v$ are recorded in tracks $T_A$ and $T_B$ with the timing shown in FIGS. 2F and 2G, respectively.

Timing signal generator 4 also supplies timing signals to a servo control circuit 25, along with a control signal CTL, a pulse signal from a pulse generator, and the like, whereby servo control circuit 25 controls the speed and phase of rotation of magnetic heads 11 and 12 and the speed of advancement of magnetic tape T such that magnetic heads 11 and 12 are in contact with magnetic tape T during the time periods $t_a$ and $t_b$, respectively. Further, it is to be appreciated that, as previously discussed, the PCM audio signal $S_a$ is compressed so as to have a period corresponding to only a fraction of the field interval within which it is situated. In this regard, timing signal generator 24 supplies a window signal $V_w$, shown in FIG. 2D, to PCM processing circuit 7 so that the latter processes and compresses the PCM audio signal $S_a$ so that signal $S_a$ is contained with a period $t_w$, shown in FIG. 2D, corresponding to the overscan section of each track.

With the above-described apparatus of FIG. 1, it is possible to separately edit the video and audio signals in the record tracks since the video and audio signals are recorded in different sections of each track. Thus, for example, it is possible to re-record a different PCM audio signal $S_a'$ in the overscan section of each track corresponding to the same video signal, whereby PCM processing circuit 7 is enabled during the period $t_w$ corresponding to the aforementioned window signal $V_w$. In such case, upon re-recording of the new PCM audio signal $S_a'$ in the overscan section of each track, the original PCM audio signal recorded $S_a$ therein is erased. However, during the re-recording operation, as a result of tape jitter caused by, for example, contraction and expansion of the magnetic tape and inaccuracies in the tape transport system, the timing of magnetic heads 11 and 12 with respect to the already recorded tracks $T_A$ and $T_B$ may change. In other words, as shown in FIG. 4, tape jitter results in magnetic tape T being displaced in the tape transport direction, indicated by arrow S, or in a direction opposite thereto. As a result, magnetic head 11 shown in FIG. 4 and the record track desired to be scanned for re-recording, that is, the record track upon which the new PCM audio signal $S_a'$ is to be re-recorded, are displaced or shifted with respect to each other, as shown by dot-dash lines 11' and 11". This, in turn, results in a time fluctuation of $\pm\beta$, that is, a time delay or advance, occurring with respect to the re-recording of the new PCM audio signal $A_s'$. More particularly, as a result of tape jitter, the PCM audio signal $S_a$, which is originally recorded during the period $t_w$, as shown in FIG. 5A, is displaced or time shifted by an amount $+\beta$, as shown in FIG. 5B, with respect to the magnetic heads. When the new PCM audio signal $S_a'$ is re-recorded on the magnetic tape during the period $t_w$, as shown in FIG. 5C, because of the shift of magnetic tape T, the new PCM audio signal $S_a'$ does not completely erase the audio signal $S_a$ originally recorded in the record tracks, thereby leaving an unerased portion shown by the hatched area in FIG. 5B. It is to be appreciated that, when the signal recorded in the hatched area of FIG. 5B is decoded by a PCM processing circuit during playback, such decoded signal results in undesirable noise.

Referring now to FIGS. 6A–6C, one aspect of the present invention will now be discussed for eliminating or substantially reducing the affects of tape jitter. More particularly, in accordance with the present invention, a dummy signal $V_d$ having a period $\alpha$ which is greater or at least equal to the maximum time fluctuation period $\beta$ caused by tape jitter, is added to the PCM audio signal to be recorded before and after the latter, as shown in FIG. 6A. For example, a clock synchronizing signal for the PCM audio signal, which is not decoded during reproduction and which is of a predetermined length, can be used for dummy signal $V_d$. In this manner, if, as shown in FIG. 6B, as a result of tape jitter, the PCM audio $S_a$ is time displaced by an amount $+\beta$, when a new PCM audio signal $S_a'$ to be re-recorded, and also including a dummy signal $V_d'$ before and after new PCM audio signal $S_2'$, is re-recorded on magnetic tape T, dummy signal $V_d'$ results in the total erasure of the signal recorded in the hatched area shown in FIG. 5B, so that only the dummy signal $V_d'$ is recorded in the aforementioned hatched area shown in FIG. 5B. It is to be appreciated that, the original dummy signal $V_d$ may not be erased during a re-recording operation so that adjacent dummy signals $V_d$ and $V_d'$ shown in FIG. 6C may both be recorded on magnetic T after a re-recording operation. In such case, adjacent dummy signals $V_d$ and $V_d'$ may be comprised of clock synchronizing signals which are not in phase. However, since a clock synchronizing signal $V_d'$ with a correct phase and sufficient length is provided, no problems occur in decoding new PCM audio signal $S_a'$.

In accordance with the present invention, as shown in FIG. 1, a dummy signal generator 26 is provided for supplying dummy signal $V_d$ to PCM processing circuit 7. In this manner, PCM processing circuit 7 compresses the PCM audio signal $S_a$ and then adds dummy signal $V_d$ both before and after the compressed PCM audio signal $S_a$, as shown in FIG. 6A. Alternatively, PCM processing circuit 7 may itself be used to produce and add dummy signal $V_d$, thereby eliminating the need for dummy signal generator 26.

Referring back to FIG. 1, during reproduction, the audio and video signals reproduced by magnetic heads 11 and 12 are supplied to change-over switches 9 and 10, respectively. During the reproduction operation, change-over switches 9 and 10 are controlled by switch control signals $V_a$ and $V_b$ to connect the movable arms thereof between fixed contacts r and p in accordance with the timing charts shown in FIGS. 2B and 2C, respectively. More particularly, when magnetic head 11 is in contact with magnetic tape T, the movable arm of change-over switch 9 is connected to fixed contact p and is connected to fixed contact r when magnetic head 11 is not in contact with magnetic tape T. In like manner, the movable arm of change-over switch 10 is connected to fixed contact p when magnetic head 12 is in contact with magnetic tape T and is in contact with fixed contact r when magnetic head 12 is not in contact with magnetic tape T.

The audio and video signals reproduced by magnetic head 11 from alternate tracks $T_A$ are supplied through fixed contact p of change-over switch 9 to fixed contacts e of change-over switches 13 and 14. In like manner, the audio and video signals reproduced by magnetic head 12 from the remaining alternate tracks $T_B$ are supplied through fixed contact p of change-over switch 10 to fixed contacts o of change-over switches 13 and 14. More particularly, change-over switches 13 and 14 are controlled by switch control signal $V_c$, in much the same manner as change-over switches 4 and 5, previously discussed. In this manner, switch control signal $V_c$ is supplied directly to change-over switch 14 to control the movable arm thereof to change-over between fixed contacts o and e thereof, and is supplied through an inverter 13a to change-over switch 13 to control the movable arm thereof to change-over between fixed contacts o and e thereof. In this manner, change-over switch 13 supplies only the video signal $S_v$ reproduced from magnetic heads 11 and 12 through a reproducing amplifier 15 and reproducing processing circuit 16 to a color video signal output terminal 17. In like manner, change-over switch 14 supplies only the reproduced PCM audio signal $S_a$ through a reproducing amplifier 18 to a PCM processing circuit 19. PCM processing circuit 19 processes the PCM audio signal in a complementary manner to PCM processing circuit 7 in the recording section of the VTR of FIG. 1, to thereby produce the original analog audio signal at an audio signal output terminal 20 thereof. In particular, PCM processing circuit 19 expands the time base of the compressed PCM audio signal supplied thereto. PCM processing circuit 19 also includes a PCM decoding circuit which provides a characteristic complementary to the PCM encoding circuit of PCM processing circuit 7 and a digital-to-analog (D/A) converting circuit which returns the digitized audio signal to analog form to thereby produce the analog audio signal at audio signal output terminal 20. In addition, PCM processing circuit 19 includes an error correcting decoder which decodes PCM audio signal $S_a$ in accordance with the error codes added by the PCM encoding circuit of PCM processing circuit 7.

In addition, during the reproducing operation, the movable arm of switch 23 is changed-over from fixed contact r to fixed contact p. In this regard, timing signal generator 24 supplies a substitute or quasi-vertical synchronizing signal $V_p$ having a frequency of 60 Hz identical to that of vertical synchronizing signal $V_s$ from recording processing circuit 2 to counter 22 through fixed contact p of switch 23. In this manner, all of the switch control signals from timing signal generator 24 are generated, during reproduction, in accordance with the substitute vertical synchronizing signal $V_p$, and servo control circuit 25 is controlled in accordance with the substitute vertical synchronizing signal $V_p$.

Figure 7A:
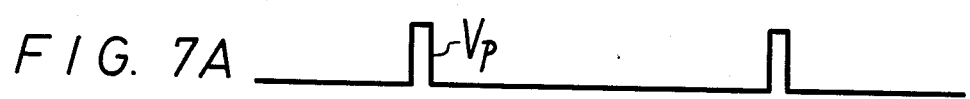
FIGS. 7A–7C are waveform diagrams used for illustrating another problem caused by tape jitter during reproduction of a digitized audio signal from the overscan section of a record track.

With the embodiment of FIG. 1, the window signal $V_w$, shown in FIG. 2D, is also supplied to PCM processing circuit 19 in order to block extraneous noise leaked from switch 14, during reproduction of the video signal from the tracks by magnetic heads 11 and 12. In other words, with this arrangement, the audio signal $S_a$ corresponding to one field interval of the video signal is processed by PCM processing circuit 19 only during the duration $t_w$ of window signal $V_w$, as shown in FIG. 7C, and in accordance with the timing of substitute vertical synchronizing signal $V_p$, as shown in FIG. 7A. In this manner, noise leaked by the heads and switches and other extraneous noise, which occur outside of the period $t_w$ of window signal $V_w$ are not processed by PCM processing circuit 19 and are therefore not supplied to audio signal output terminal 20.

Figure 7B:
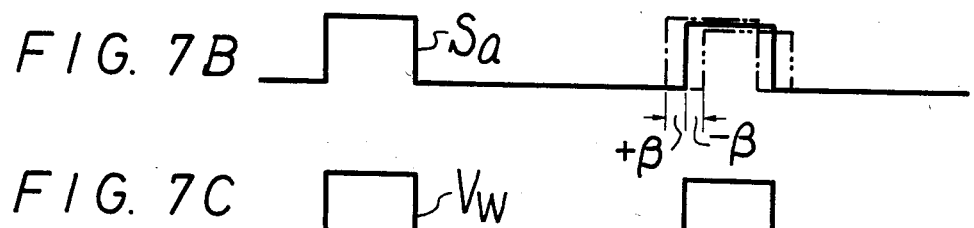
Figure 7C:
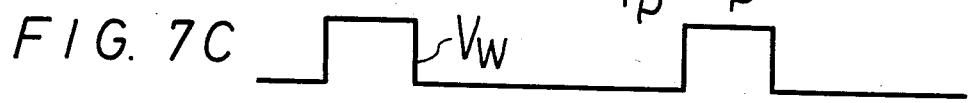

However, with the aforesaid apparatus, because of tape jitter resulting from contraction and expansion of the tape, inaccuracies in the tape transport system, delays in the change-over between switches 13 and 14, and the like, timing of the reproduced PCM audio signal varies in accordance with the tape fluctuation $\beta$, as shown in FIG. 7B. As a result, a portion of the PCM audio signal $S_a$ as reproduced occurs outside of the time period $t_w$ of window signal $V_w$, supplied to PCM processing circuit 19, whereby errors in the reproduction of the audio signal results.

Figure 8A:
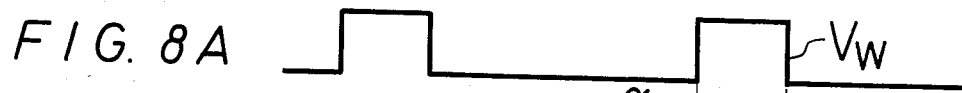
FIGS. 8A–8C are waveform diagrams used to explain the operation of the apparatus of FIG. 1 according to the present invention in overcoming the problem of tape jitter shown in FIGS. 7A–7C.
Figure 8B:
Figure 8C:

In accordance with another aspect of this invention for eliminating or substantially reducing the affects of tape jitter, an enlarged window signal $V_w'$, as shown in FIG. 8B, is supplied to PCM processing circuit 19, in place of window signal $V_w$, shown in FIGS. 2D and 8A. More particularly, enlarged window signal $V_w'$ is widened or enlarged by a duration $\alpha$ on each side of window signal $V_w$, where the widened duration $\alpha$ is selected to be larger than the maximum time displacement duration $\beta$ resulting from tape jitter. Accordingly, with the present invention, even if tape jitter results in a time shift of the reproduced PCM audio signal during playback, PCM processing circuit 19 is enabled by enlarged window signal $V_w'$ to process the entire PCM audio signal, as shown in FIG. 8C. It is to be appreciated that any extraneous noise which may also be processed during the duration of enlarged window signal $V_w'$ is of such a small amount as to be negligible. In order to change the duration $\alpha$ of the widening of window signal $V_w$, timing signal generator 24 may include a decoder which widens window signal $V_w$ in accordance with a value which can be changed, for example, by a switching arrangement.

It is to be appreciated that many modifications can be made to the present invention by one skilled in the art. For example, all of the switches shown in the drawings can be constructed from semiconductor devices.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording an information signal comprised of a video signal and an audio signal in a plurality of successive tracks on a record medium, said apparatus being subject to jitter fluctuations having a maximum time fluctuation duration corresponding to a maximum jitter fluctuation, said apparatus comprising:
   converting means for converting said audio signal into digital form;
   compression means for compressing said digitized audio signal such that the compressed digitized audio signal to be recorded in any one of said tracks has a first time duration;
   compensation means for providing a dummy signal for a second time duration at least as long as said maximum time fluctuation duration; and
   transducer means for recording said video signal in a main section of each track and said compressed digitized audio signal and said dummy signal in an overscan section of each track, said dummy signal being recorded in the overscan portion of each track at least one of before and after said compressed digitized audio signal recorded therein.

2. Apparatus according to claim 1, in which said transducer means records said dummy signal for said second time duration both before and after said compressed digitized audio signal in the overscan portion in each track.

3. Apparatus for reproducing an information signal comprised of a video signal and a digitized audio signal recorded in a plurality of successive tracks on a record medium, with the video signal being recorded in a main section of each track and the digitized audio signal being recorded in an overscan section of each track, said apparatus being subject to jitter fluctuations having a maximum time fluctuation duration corresponding to a maximum jitter fluctuation, said apparatus comprising:

transducer means for scanning said tracks to reproduce said information signal recorded in said plurality of successive tracks;

switch means for separating said video signal reproduced in a first time interval during scanning of the main section of each track by said transducer means and the digitized audio signal reproduced in a second time interval during scanning of the overscan section of each track by said transducer means;

processing means for converting said digitized audio signal to an analog audio signal; and compensation means for enabling said processing means for a period of time greater than said second time interval by at least said maximum time fluctuation duration.

4. Apparatus according to claim 3, in which said compensation means enables said processing means for a total time extending from a time prior to the start of said second time interval by said maximum time fluctuation duration to a time following the end of said second time interval by said maximum time fluctuation duration.

5. Apparatus according to claim 4; which said compensation means produces an enlarged window signal having a length equal to said total time and supplies said enlarged window signal to said processing means for enabling the latter only during the production of said enlarged window signal.

6. Apparatus according to claim 5; in which said video signal is a color video signal including a vertical synchronizing signal having a period and said compensation means produces a substitute vertical synchronizing signal having a period substantially equal to the period of said vertical synchronizing signal of said color video signal; further including oscillator means for producing a clock signal comprised of a plurality of clock pulses, and counter means for counting said clock pulses during a period determined by said substitute vertical synchronizing signal and producing an output in response thereto; and in which said compensation means produces said enlarged window signal in response to said output of said counter means.

7. Apparatus for recording and reproducing an information signal comprised of a video signal and an audio signal in a plurality of successive trackson a record medium, said apparatus being subject to jitter fluctuations having a maximum time fluctuation duration corresponding to a maximum jitter fluctuation, said apparatus comprising:

a recording section including:
converting means for converting said audio signal into digital form;
compression means for compressing said digitized audio signal such that the compressed digitized audio signal to be recored in any one of said tracks has a first time duration;
first compensation means for providing a dummy signal for a second time duration at least as long as said maximum time fluctuation duration; and
first transducer means for recording said video signal in a main section of each track and said compressed digitized audio signal and said dummy signal in an overscan section of each track, said dummy signal being recorded in the overscan portion of each track at least one of before and after said compressed digitized audio signal recorded therein; and
a reproducing section including:

second transducer means for scanning said tracks to reproduce said information signal recorded in said plurality of successive tracks;

switch means for separating said video signal reproduced in a first time interval during scanning of the main section of each track by said second transducer means and the digitized audio signal reproduced in a second time interval during scanning of the overscan section of each track by said second transducer means;

processing means for converting said digitized audio signal to an analog audio signal; and second compensation means for enabling said processing means for a period of time greater than said second time interval by at least said maximum time fluctuation duration.

8. Apparatus according to claim 7, in which said compensation means enables said processing means for a total time extending from a time prior to the start of said second time interval by said maximum time fluctuation duration to a time following the end of said second time interval by said maximum time fluctuation duration.

9. Apparatus according to claim 8, in which said compensation means produces an enlarged window signal having a length equal to said total time and supplies said enlarged window signal to said processing means for enabling the latter only during the production of said enlarged window signal.

10. Apparatus according to claim 9, in which said video signal is a color video signal including a vertical synchronizing signal having a period and said compensation means produces a substitute vertical synchronizing signal having a period substantially equal to the period of said vertical synchronizing signal of said color video signal; further including oscillator means for producing a clock signal comprised of a plurality of clock pulses, and counter means for counting said pulses during a period determined by said substitute vertical synchronizing signal and producing an output in response thereto; and in which said compnesation means produces said enlarged window signal in response to said output of said counter means.

11. A method of recording an information signal comprised of a video signal and an audio signal in a plurality of successive tracks on a record medium by means of an apparatus subject to jitter fluctuations having a maximum time fluctuation duration corresponding to a maximum jitter fluctuation, comprising the steps of:
converting said audio signal into digital form;
compressing said digitized audio signal such that the compressed digitized audio signal to be recorded in any one of said tracks has a first time duration;
providing a dummy signal for a second time duration at least as long said maximum time fluctuation duration; and
recording said video signal in a main section of said track and said compressed digitized audio signal and said dummy signal in an overscan section of each track, said dummy signal being recorded in the overscan portion of each track at least one of before and after said compressed digitized audio signal recorded therein.

12. A method according to claim 11, wherein said step of recording includes the step of recording said dummy signal both before and after said compressed digitized audio signal in the overscan section of each track.

13. A method of reproducing an information signal comprised of a video signal and a digitized audio signal recorded in a plurality of successive tracks on a record medium by an apparatus subject to jitter fluctuations having a maximum time fluctuation duration corresponding to a maximum jitter fluctuation, with the video signal being recorded in a main section of each track and the digitized audio signal being recorded in an overscan section of each track, said method comprising the steps of:

scanning said tracks to reproduce said information signal recorded in said plurality of successive tracks;

separating said video signal reproduced in a first time interval during scanning of the main section of each track and the digitized audio signal reproduced in a second time interval during scanning of the overscan section of each track; and converting said digitized audio signal to an analog audio signal for a period of time greater than said second time interval by at least said maximum time fluctuation duration.

14. A method according to claim 13, wherein said step of converting is enabled for a total time extending from a time prior to the start of said second time interval by said maximum time fluctuation duration to a time following the end of said second time interval by said maximum time fluctuation duration.

15. A method according to claim 14; in which said step of converting includes the steps of producing an enlarged window signal having a length equal to said total time, and the step of supplying said enlarged window signal for enabling the converting of said digitized audio signal only during the duration of said enlarged window signal.

16. A method recording and reproducing an information signal comprised of a video signal and an audio signal in a plurality of successive tracks on a record medium by means of an apparatus subject to jitter fluctuations having a maximum time fluctuation duration corresponding to a maximum jitter fluctuation, comprising the recording steps of:

converting said audio signal into digital form;

compressing said digitized audio signal such that the compressed digitized audio signal to be recorded in any one of said tracks has a first time duration;

providing a dummy signal for a second time duration at least as long said maximum time fluctuation duration; and recording said video signal in a main section of said track and said compressed digitized audio signal and said dummy signal in an overscan section of each track, said dummy signal being recorded in the overscan portion of each track at least one of before and after said compressed digitized audio signal recorded therein; and comprising the reproducing steps of:

scanning said tracks to reproduce said information signal recorded in said plurality of successive tracks;

separating said video signal reproduced in a first time interval during scanning of the main section of each track and the digitized audio signal reproduced in a second time interval during scanning of the overscan section of each track; and converting said digitized audio signal to an analog signal for a period of time greater than said second time interval by at least said maximum time fluctuation duration.

17. A method according to claim 16, wherein said step of recording includes the step of recording said dummy signal both before and after said compressed digitized audio signal in the overscan section of each track.

18. A method according to claim 17, wherein said step of converting is enabled for a total time extending from a time prior to the start of said second time interval by said maximum time fluctuation duration to a time following the end of said second time interval by said maximum time fluctuation duration.

19. A method according to claim 18, in which said step of converting includes the steps of producing an enlarged window signal having a length equal to said total time, and the step of supplying said enlarged window signal for enabling the converting of said digitized audio signal only during the duration of said enlarged window signal.

* * * * *